United States Patent [19]

Bacardit

[11] Patent Number: 4,757,836
[45] Date of Patent: Jul. 19, 1988

[54] PRESSURIZED FLUID MODULATOR ASSEMBLY, PARTICULARLY FOR A POWER-ASSISTED STEERING SYSTEM IN A VEHICLE

[75] Inventor: Juan S. Bacardit, Barcelona, Spain

[73] Assignee: Bendix Espana S.A., Barcelona, Spain

[21] Appl. No.: 54,904

[22] Filed: May 27, 1987

[51] Int. Cl.$^4$ .............................................. B62D 5/06
[52] U.S. Cl. ........................................ 137/115; 91/468
[58] Field of Search ................... 137/115; 91/452, 468

[56] References Cited

U.S. PATENT DOCUMENTS 1,923,127 8/1933 Veenschoten ................... 91/452 X
3,537,356 11/1970 Odell .................................. 91/452 X

FOREIGN PATENT DOCUMENTS 109085 5/1984 European Pat. Off. .

Primary Examiner—Robert G. Nilson
Attorney, Agent, or Firm—Larry J. Palguta; Ken C. Decker

[57] ABSTRACT

A modulator assembly is interposed in a fluid circuit between a source (S) and a user device (U), said assembly being composed of a metering electrovalve (E) forming a first restriction ($\sigma 1$) in the fluid circuit, a pressure regulation valve (R), loaded by a spring (22), being subjected to the pressure of fluid delivered by the metering electrovalve to the user device and forming a second variable restriction ($\sigma 2$) between the outlet of the electrovalve (E) and a tank (33). The pressure regulation valve (R) is integrated into the metering slide (14) of the electrovalve.

8 Claims, 2 Drawing Sheets

PRESSURIZED FLUID MODULATOR ASSEMBLY, PARTICULARLY FOR A POWER-ASSISTED STEERING SYSTEM IN A VEHICLE

The present invention relates to pressurized fluid modulator assemblies, particularly for power-assisted steering systems for vehicles, more particularly for modulating the reaction pressure in power-assisted steering systems, which assemblies are of the type intended to be interposed in a fluid circuit between a pressure source and a hydraulic user device, typically a hydraulic reaction device in a power-assisted steering system, and comprise: a metering electrovalve, typically controlled by electric signals corresponding to significant running parameters of a vehicle, and comprising a coil and a core forming a metering slide mounted for sliding in a first bore into which leads an inlet port intended to be connected to the pressure source, said slide defining in conjunction with said inlet port a first variable restriction between said inlet port and a metering port provided in said slide and intended to be connected to the user device; and a pressure regulation valve comprising a regulation slide loaded by a spring and sliding in a second bore into which leads a discharge port in communication with a tank, the regulation slide having a first face exposed to the pressure delivered by the metering electrovalve to the user device and forming, together with the discharge port, a variable restriction for the relief of said fluid circuit.

A modulator assembly of this type is described in document EP-A- 0 109 085. In this document the modulator assembly, which is intended to modulate the fluid flow directed towards the distribution valve of a vehicle power-assisted steering system for the purpose of modulating the assistance force supplied by said power-assisted steering system, comprises a pressure regulation valve whose regulation slide is subjected to the pressure differential on each side of the first variable restriction of the metering electrovalve for the purpose of maintaining constant the flow metered by the metering electrovalve and directed towards the distribution valve of the power-assisted steering system.

The present invention seeks to provide a safety fluid modulator assembly making it possible to ensure that the pressure of the fluid metered by the metering electrovalve and directed towards the user device does not exceed a determined maximum value.

For this purpose, according to one characteristic of the invention, in a pressurized fluid modulator assembly of the type defined above, the regulation slide of the regulation valve has a second face which is oppositely situated to the first face, is exposed to the pressure of the tank and cooperates with the loading spring.

The present invention further seeks to provide a pressurized fluid modulator assembly of the type defined, which is particularly neat and compact in construction, reliable and accurate in operation, and has very low hysteresis.

For this purpose, according to another characteristic of the invention the second bore, in which the regulation slide of the pressure regulation valve slides, is formed in the metering slide of the metering electrovalve.

With an arrangement of this kind the regulation slide of the pressure regulation valve is thus exposed to the pressure of the fluid immediately downstream of the first variable restriction of the metering electrovalve, thus providing increased security by avoiding any risk of even momentary accidental overpressure in the circuit of the hydraulic user device.

Other characteristics and advantages of the present invention will emerge from the following description of one embodiment, given by way of illustration without in any way being limitative, this description being given with reference to the accompanying drawings, in which.

Figure 1:
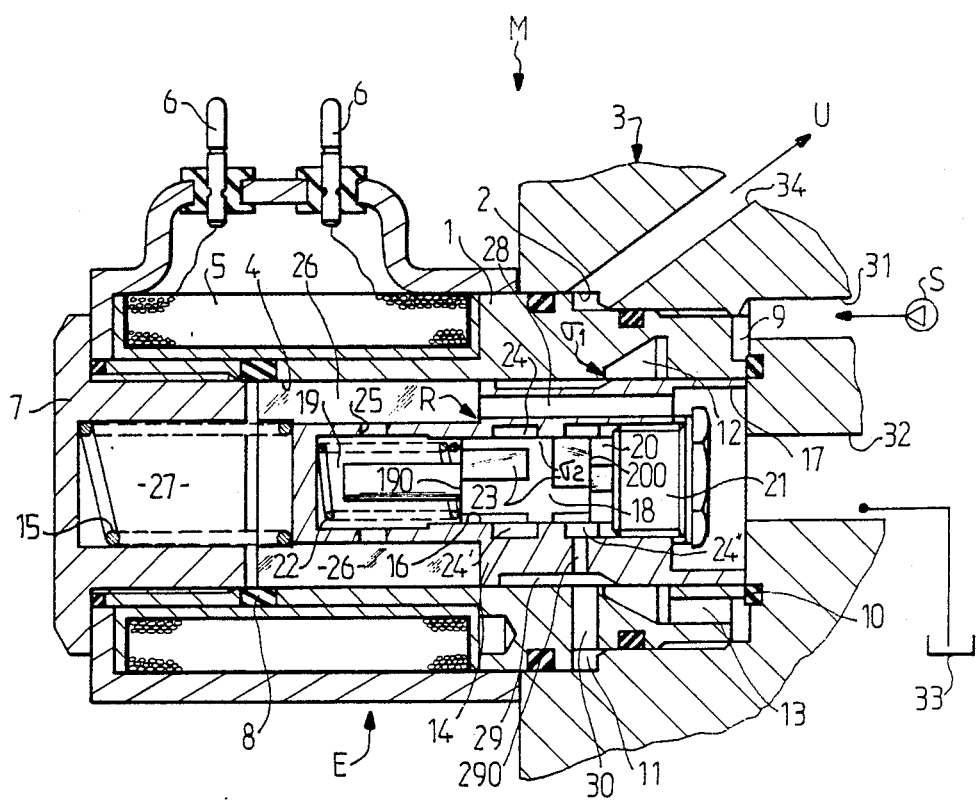
FIG. 1 is a schematic view in section of an integrated modulator assembly according to the invention.

The pressurized fluid modulator assembly M shown in FIG. 1 comprises a metering electrovalve E comprising a tubular electrovalve support 1 of non-magnetic material, mounted, for example screwed, into a stepped socket 2 in a body 3 comprising a series of fluid passages, as will be seen later on. The electrovalve support 1 has a longitudinal through bore 4 and supports an electromagnetic coil 5 intended to be connected to an electric control circuit (not shown) by means of terminals 6 and held in position on the support 1 and against the body 3 by a cover 7 screwed into the outer end of the bore 4 with the interposition of a seal 8. The inner end of the support 1 has a recessed frontal zone forming, in conjunction with the bottom of the socket 2, an annular chamber 9 sealed in relation to the bore 4 by an annular seal 10. The support 1 also has an intermediate shoulder defining, in conjunction with an adjacent shoulder on the socket 2, an annular chamber 11 sealed on each side by a pair of annular seals. The support 1 also has an internal annular chamber 12 having an evolutive profile, leading into the bore 4 and communicating with the annular end chamber 9 by way of a longitudinal passage 13.

An electrovalve core is mounted slidably in the bore 4 and forms a metering slide 14 urged against the bottom of the socket 2 in the body 3 by a spring 15 bearing against the cover 7. The slide 14 has a blind central bore 16 leading, on the opposite side to the spring 15, into an internal end chamber 17 formed in the slide 14 and permanently communicating with that portion of the bottom of the socket 2 which is circumscribed by the seal 10. According to one aspect of the invention there is slidably mounted in the bore 16 a pressure regulation slide 18 of a regulation valve R, dividing the second bore 16 into a rear chamber 19, bounded on the other side by the blind bottom of the second bore 16, and a front chamber 20 bounded on the other side by a closure member 21 screwed into the bore 16 and sealingly separating the latter from the end chamber 17. The slide 18 is urged in the direction of the closure member 21 by a calibrated spring 22 bearing against the bottom of the bore 16 and cooperating with and bearing against the adjacent face 190 of the slide 18. In its periphery the slide 18 has at least one pair of ports 23 axially spaced apart and forming in conjunction with an annular surface 24 between two axially adjacent ports 24', 24'' in the bore 16 a passage or restriction $\sigma 2$ variable in dependence on the position of the slide 18 in the bore 16. The rear chamber 19 of the slide 14 communicates via at least one radial passage 25 with at least one external longitudinal groove 26 in communication, towards the rear, with a chamber 27 formed in the bore 4 between the cover 7 and the slide 14 and, towards the front, via a longitudinal duct 28 with the end chamber 17. In its periphery the slide 14 has an annular groove 29 which towards the front has an evolutive profile defining, with the annular chamber 12 of the support 1, a restriction σ1 variable in dependence on the position of the slide 14 in the bore 4. The groove 29 is in permanent communication with a radial passage 30 formed in the support 1 and leading into the intermediate annular chamber 2 and, by way of a transverse passage 290 formed in the slide 14, with the front chamber 20. In the body 3 there are formed an inlet passage 31 intended to be connected to a pressurized fluid source S and leading into the annular end chamber 9, a discharge passage 32 intended to be connected to a tank 33 and leading into the bore 4 in communication with the end chamber 17 of the slide 14, and an outlet passage 34 intended to be connected to a hydraulic user device U and communicating with the intermediate annular chamber 2.

The modulator assembly according to the invention functions in the following manner. In the position of rest shown in FIG. 1 the metering slide 14 bears through the action of the spring 15 against the bottom of the socket 2, thus forming, between the input port 12 and the metering port 29, a restriction offering maximum passage section for the fluid between the source S and the user device U. The regulation slide 18 normally bears, because of the action of the spring 22, against the closure member 21, in a position isolating from one another the internal chamber 20, which is under the pressure prevailing in the outlet passage 34 to the user device, and the chamber 19, which is permanently in communication with the tank 33 by way of the passages 25, 26, 28, the chamber 17, and the passage 32. If at this stage overpressure originating from the source S occurs, this overpressure, acting in the chamber 20 on the adjacent face 200 of the regulation slide 18, will move the latter against the action of the calibrated spring 22 to open a determined restriction σ2 between the chambers 20 and 19, and thus to divert part of the fluid coming from the source S to the tank 33. In the active modulation mode, through the action of a magnetic field of a determined strength applied to the coil 5 on the metering slide 14, the latter will be slightly moved against the action of the spring 15, so as as to restrict the restriction σ1 and thus to modulate the pressurized fluid on its way to the user device U. According to the invention, whatever the value of the variable restriction σ1, any overpressure originating from the source S and detected in the chamber 20 will enable the regulation slide 18 to limit the pressure delivered to the user device to the maximum value predetermined by the calibration of the spring 22, without affecting the functioning of the metering slide 14, which remains balanced since it is permanently subjected to the pressure of the tank 33 on its two opposite sides.

Figure 2:
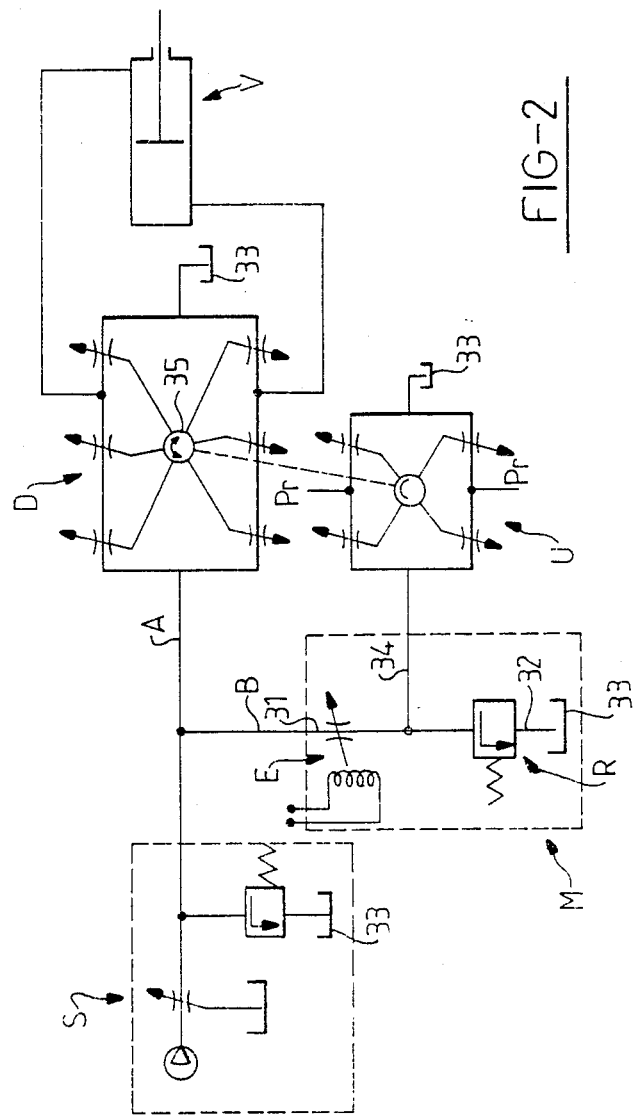
FIG. 2 is a diagram illustrating a preferential utilization of the modulator assembly according to the invention.

FIG. 2 shows a circuit for a power-assisted steering system for a vehicle, incorporating a modulator assembly M according to the invention, such as that described above. The power-assisted steering assembly comprises a distribution valve D adapted to be operated by an input component 35, typically coupled to a steering wheel, for controlling an assistance ram V. The distribution valve D received direct, via a duct A, the fluid coming from the source S, which is optionally provided with its own modulator assembly similar to that according to the invention. The power-assisted steering device comprises in addition a hydraulic reaction device U operated by the input component 35, for the purpose of supplying in the latter a reaction moment opposing the operating moment of the distribution valve D. The reaction device U is pilot controlled by a modulator assembly M according to the invention, which is interposed in the fluid circuit B between the source S and the reaction device U. A power-assisted steering device of this type is described in document EP-A- 0 112 209 in the name of the applicants, the contents of which are to be assumed to be integrated herein for reference.

I claim:

1. A pressurized fluid modulator assembly intended to be interposed in a fluid circuit between a pressure source and a hydraulic user device, comprising a metering electrovalve comprising a coil and a core forming a metering slide mounted for sliding in a first bore into which leads an inlet port intended to be connected to the pressure source, said metering slide defining a first variable restriction between the inlet port and a metering port provided in said slide and intended to be connected to the user device, and a pressure regulation valve comprising a regulation slide loaded by a spring and sliding in a second bore into which leads a discharge port in communication with a tank, the regulation slide having a first face exposed to the pressure delivered by the metering electrovalve to the user device and forming, together with the discharge port, a second variable restriction for the relief of said fluid circuit, characterized in that the regulation slide of the regulation valve has a second face exposed to the pressure of the tank and cooperating with the loading spring, and the second bore, in which slides the regulation slide, formed in the metering slide of the metering electrovalve.

2. The assembly according to claim 1, characterized in that the metering port is formed in the periphery of the metering slide and is permanently in communication with an outlet port leading into the first bore.

3. The assembly according to claim 2, characterized in that the second bore communicates via a first end with the metering port and, via a second end accommodating the loading spring, with an internal passage provided in the metering slide and in communication with the tank.

4. The assembly according to claim 3, characterized in that the second bore is blind and leads, at the first end, into an end chamber communicating with the tank, said first end of the second bore being closed by a closure member.

5. The assembly according to claim 4, characterized in that the internal passage of the metering slide has at least one external longitudinal groove communicating with the first bore, with the second end of the second bore, and with a longitudinal duct in communication with the end chamber.

6. The assembly according to claim 1, characterized in that the first bore is formed in an electrovalve support mounted in a stepped socket in a body in which fluid passages are formed for connection to the source, to the user device, and to the tank.

7. The assembly according to claim 6, characterized in that the coil of the electrovalve is held on the support by a cover closing the first bore.

8. The assembly according to claim 7, characterized in that the electrovalve contains a loading spring disposed between the cover and the metering slide.

* * * * *